Patented Apr. 4, 1944

2,345,635

UNITED STATES PATENT OFFICE 2,345,635

DI-ESTERS OF 3,3'-METHYLENEBIS(4-HYDROXYCOUMARIN) AND PROCESS OF MAKING THEM

Mark A. Stahmann and Karl Paul Link, Madison, Wis., assignors to Wisconsin Alumni Research Foundation, Madison, Wis., a corporation of Wisconsin No Drawing. Application April 11, 1942, Serial No. 438,564

9 Claims. (Cl. 260—344.6)

Our present invention relates to the new di-esters of 3,3'-methylenebis(4-hydroxycoumarin), and to the process of making them.

As is set forth in the co-pending application Serial No. 414,688, filed October 11, 1941, by us jointly with Harold A. Campbell and Charles F. Huebner, the compound 3,3'-methylenebis(4-hydroxycoumarin) is an anticoagulant which is suitable for administration to man. It may be obtained from spoiled sweet clover hay, by extraction procedures set forth in that co-pending application Serial No. 414,688. It may be synthesized by causing 4-hydroxycoumarin to react with formaldehyde in boiling ethyl alcohol, as is also set forth in said co-pending application Serial No. 414,688. The 4-hydroxycoumarin used in that synthesis may itself be synthesized from acetyl methylsalicylate, by heating the latter to 165° on an oil bath in an open beaker, introducing metallic sodium and stirring over a period of an hour, and maintaining the temperature between 165° and 175° during that period by suitable cooling means.

The compound 3,3'-methylenebis(4-hydroxycoumarin) exists both in the enol form indicated by that name, and in the keto form 3,3'-methylenebis(2,4-diketochroman); as is indicated by the following formula:

(1) 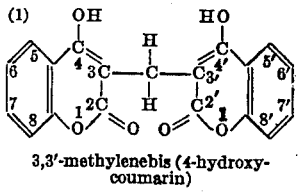

3,3'-methylenebis(4-hydroxy-coumarin)

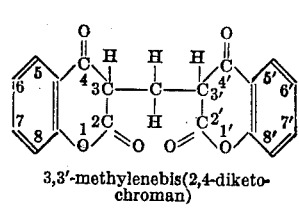

3,3'-methylenebis(2,4-diketo-chroman)

We have found that this compound, in its enol form, reacts with organic acid anhydrides and with acid halides to esterify both enolic hydroxyl groups, and thus to produce di-esters which have the following general formula:

(2) 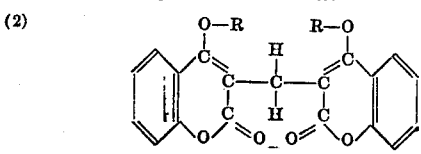

in which R represents an acyl group. (By "acyl group," as we use it here, we do not include the formyl group.) The general formula of the new compounds may also be written as follows:

(3) 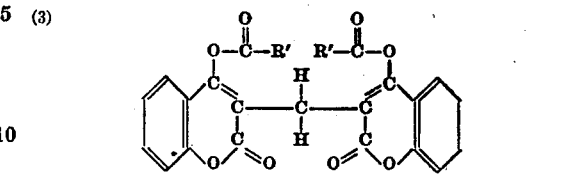

in which R' represents a monovalent hydrocarbon radical which with a carboxyl group forms an organic acid.

The reaction forming these new di-esters may be represented by the following formulas, for the organic-acid anhydrides and the acid chlorides respectively:

(4) 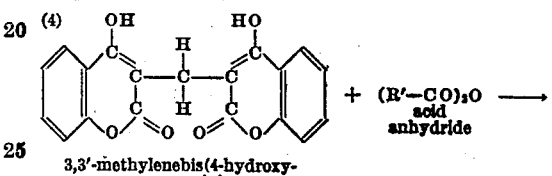

3,3'-methylenebis(4-hydroxy-coumarin)

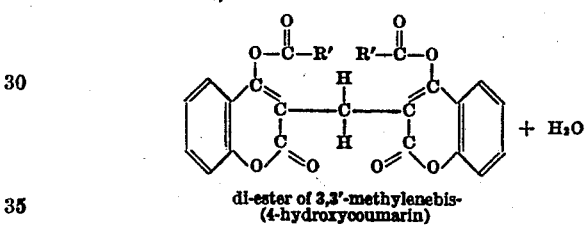

di-ester of 3,3'-methylenebis-(4-hydroxycoumarin)

(5) 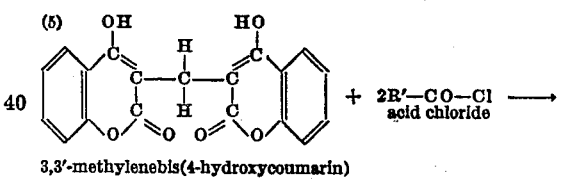

3,3'-methylenebis(4-hydroxycoumarin)

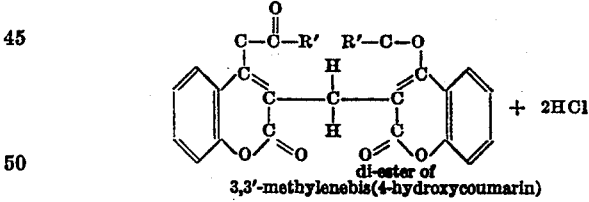

di-ester of 3,3'-methylenebis(4-hydroxycoumarin)

in each of which R' has the same meaning as before.

These reactions may be carried out by either of two general methods:

*Method A.*—According to Method A, the 3,3'-methylenebis(4-hydroxycoumarin) is dissolved in a basic organic solvent, suitably pyridine, and desirably with a minimum volume of the solvent for obtaining solution; and the desired acid chloride (or other acid halide) or organic acid anhydride is slowly added, in marked excess, with constant stirring. This marked excess over the theoretical amount is found to increase the yields; and we have found it desirable to use from 20 to 50 molecular equivalents as such excess when the organic acid anhydride is used, and to use about 3 to 10 molecular equivalents as such excess when an acid halide is used. Desirably the solution is cooled before and kept cool during the addition of the acid chloride or organic acid anhydride. After such addition has been completed, the mixture is allowed to stand for several hours, desirably at room temperature or less, during which time the crystals of the di-ester separate. These crystals are collected, and washed with a solvent in which they are insoluble but the unreacted reagents are soluble, suitably ethyl alcohol. The crude crystals thus obtained may be recrystallized from a suitable medium, such for instance as cyclohexanone.

*Method B.*—According to Method B, the 3,3'-methylenebis(4 - hydroxycoumarin) is mixed with an excess of the organic acid anhydride, and the mixture is heated, desirably by refluxing, for several hours, conveniently at normal pressure. The mixture is then allowed to stand at refrigerator temperature, say about 4° C., for several hours, conveniently over night, during which time the di-ester crystallizes out. The crystals may be collected, as by filtration, and washed and recrystallized as in Method A.

The following are examples of our method, and of our new products:

EXAMPLE 1.—*3,3'-methylenebis(4-hydroxycoumarin) diacetate*

(6)

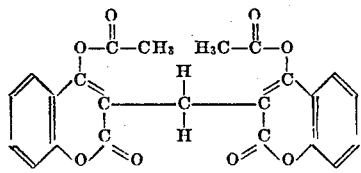

*Method A.*—Two grams (0.006 mole) of 3,3'-methylenebis(4-hydroxycoumarin) are dissolved in a minimum volume of basic organic solvent, suitably pyridine. When pyridine is used, 25 ml. is sufficient, and it is desirable to heat the pyridine to effect more rapid solution. The solution is cooled to about 10° C., and 25 g. (0.24 mole) of acetic anhydride is slowly added, with stirring, while the mixture is maintained at this temperature by a cooling bath. The mixture is allowed to stand about 12 hours at about 25° C., during which time crystals of the diacetate separate from the solution. These are collected, as by filtration, and washed with a solvent in which the ester is insoluble and in which the unreacted reagents are soluble, suitably methyl or ethyl or isopropyl alcohol or water. The yield is about 2.3 g., which is about 90%. The crude product thus obtained is recrystallized from a suitable medium, such as cyclohexanone. After such recrystallization, the 3,3' - methylenebis(4 - hydroxycoumarin) diacetate obtained melts with decomposition at about 250–252° C.; and analyzes for $C_{19}H_{10}O_6(OCCH_3)_2$ In the foregoing method we may use acetyl chloride or acetyl bromide or acetyl fluoride or acetyl iodide in place of the acetic anhydride; but if acetyl fluoride is used it is necessary to operate at lower temperatures, and thus to do more drastic cooling.

*Method B.*—Five grams (0.015 mole) of 3,3'-methylenebis(4-hydroxycoumarin) is refluxed 4 hours with 60 g. (0.6 mole) of acetic anhydride. The mixture is then allowed to stand at about 4° C. for about 12 hours, to complete crystallization of the diacetate; which is collected, as by filtration, and washed with a solvent, suitably ethyl alcohol or water, to remove acetic anhydride and acetic acid. The yield is about 5.8 g., which is about 92%. The product thus obtained, without further purification as by recrystallization, melts at about 250–252° C., with decomposition.

EXAMPLE 2.—*3,3'-methylenebis(4-hydroxycoumarin) dipropionate*

(7)

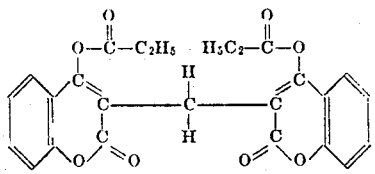

*Method A.*—This dipropionate may be prepared by the procedure given for the diacetate under Example 1, save that an excess of propionic anhydride (about 26.7 g.) or propionyl chloride is used in place of acetic anhydride or acetyl chloride. The dipropionate is separated, and recrystallized, in the same manner as the diacetate of Example 1. The yield is about 2.0 g., which is about 77%. 3,3' - methylenebis(4 - hydroxycoumarin) dipropionate melts with decomposition at about 247–248° C., and analyzes for $C_{19}H_{10}O_6(OCCH_2CH_3)_2$.

*Method B.*—Five grams (0.015 mole) of 3,3'-methylenebis(4 - hydroxycoumarin) is refluxed with 78 g. (0.6 mol) of propionic anhydride. The mixture is then stirred to induce crystallization of the dipropionate, and is allowed to stand at about 4° C. for about 12 hours to complete that crystallization. The crystals are collected, as by filtration, and washed with a suitable washing solvent, suitably ethyl alcohol or water, to remove propionic anhydride and propionic acid. The yield is about 6.0 g., which is about 90%. Without further purification the product is found to melt at 246–248° C., with decomposition.

EXAMPLE 3.—*3,3'-methylenebis(4-hydroxycoumarin) di-n-butyrate*

(8)

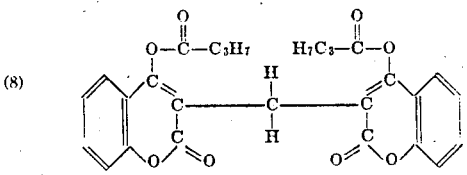

This di-n-butyrate is prepared by either Method A or Method B, in the same procedure as set forth under Example 1. In Method A it is convenient to use about 5.1 g. (0.048 mole) of n-butyryl chloride for this reaction, in place of acetic anhydride. The di-n-butyrate produced is separated, and recrystallized, in the same manner as the diacetate of Example 1. The yield is about 1.9 g., or about 69%. 3,3'-methylenebis(4- hydroxycoumarin) di-n-butyrate melts at about 227–228° C., and analyzes for

EXAMPLE 4.—*3,3'-methylenebis(4-hydroxycoumarin) di-iso-butyrate*

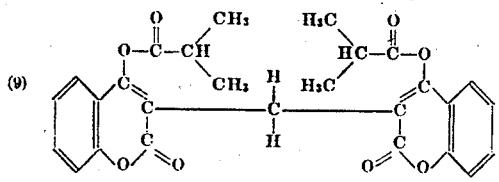

This di-isobutyrate is prepared by either Method A or Method B, by the procedure given in Example 1 for the diacetate; thus in Method A about 2.5 g. (0.024 mole) of isobutyryl chloride is used. The di-iso-butyrate is separated and recrystallized in the same manner as the diacetate. The yield is about 2.3 g., which is about 82%. 3,3'-methylenebis(4-hydroxycoumarin) di-iso-butyrate melts at about 233–234° C., and analyzes for $C_{19}H_{10}O_6(OCCH(CH_3)_2)_2$.

EXMPLE 5.—*3,3'-methylenebis(4-hydroxycoumarin) di-n-valerate*

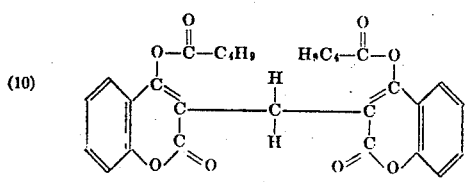

This di-n-valerate is prepared by either Method A or Method B, by procedures substantially the same as that for the diacetate in Example 1; in Method A about 2.9 g. (0.024 mole) of n-valeryl chloride is used in place of the acetic anhydride. The di-n-valerate is separated and recrystallized in the same manner as the di-acetate. The yield is about 2.0 g., which is about 48%. 3,3'-methylenebis(4-hydroxycoumarin) di-n-valerate melts at about 224–225° C., and analyzes for $C_{19}H_{10}O_6(OCCH_2CH_2CH_2CH_3)_2$.

EXAMPLE 6.—*3,3'-methylenebis(4-hydroxycoumarin) di-iso-valerate*

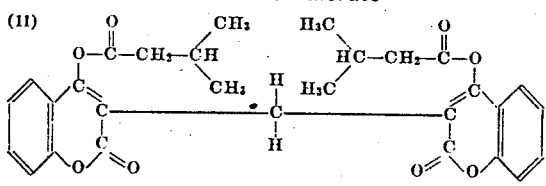

The di-iso-valerate may be prepared by either Method A or Method B, by the procedure given for the diacetate in Example 1; thus in Method A about 2.0 g. (0.024 mole) of iso-valeryl chloride is used in place of the acetic anhydride. The di-iso-valerate is separated and recrystallized in the same manner as the diacetate. The yield is about 2.2 g., which is about 51%. 3,3'-methylenebis(4-hydroxycoumarin) di-iso-valerate melts at about 234–236° C., and analyzes for $C_{19}H_{10}O_6(OCCH_2CH(CH_3)_2)_2$ EXAMPLE 7.—*3,3'-methylenebis(4-hydroxycoumarin) di-iso-caproate*

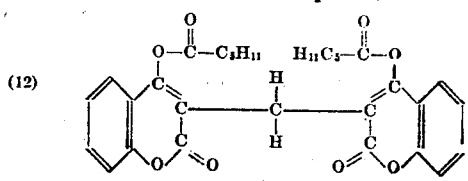

This di-n-caproate is prepared by either Method A or Method B, by the procedure given for the diacetate in Example 1; thus in Method A about 2.4 g. (0.018 mole) of n-caproyl chloride is used in place of the acetic anhydride. The di-n-caproate is separated and recrystallized in the same manner as the diacetate. The yield is about 1.7 g., which is about 63%. 3,3'-methylenebis-(4-hydroxycoumarin) di-n-caproate melts at about 220–221° C., and analyzes for $C_{19}H_{10}O_6(OCCH_2CH_2CH_2CH_2CH_3)_2$ EXAMPLE 8.—*3,3'-methylenebis(4-hydroxycoumarin) di-n-heptanoate*

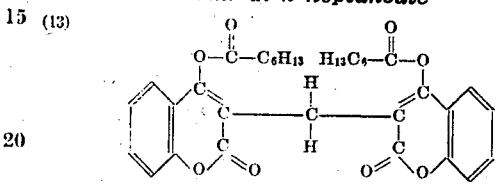

This di-n-heptanoate may be prepared by either Method A or Method B, by the procedure given for the diacetate in Example 1; thus in Method A about 3.5 g. (0.024 mole) of n-heptanoyl chloride is used in place of the acetic anhydride. The di-n-heptanoate is separated and recrystallized in the same manner as the diacetate. The yield is about 2.3 g., which is about 50%. 3,3'-methylenebis(4-hydroxycoumarin) di-n-heptanoate melts at about 215–216° C., and analyzes for $C_{19}H_{10}O_6(OCCH_2CH_2CH_2CH_2CH_2CH_3)_2$ EXAMPLE 9.—*3,3'-methylenebis(4-hydroxycoumarin) dibenzoate*

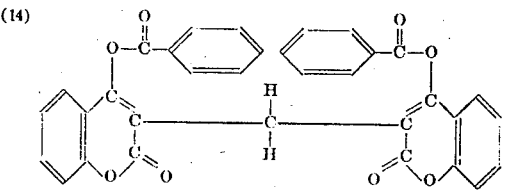

This dibenzoate is prepared by either Method A or Method B, by the procedure given for the diacetate under Example 1; in Method A about 3.4 g. (0.024 mole) of benzoyl chloride is used in place of the acetic anhydride. The dibenzoate is separated and recrystallized in the same manner as the diacetate. The yield is about 2.6 g., which is about 81%. 3,3'-methylenebis(4-hydroxycoumarin) dibenzoate melts with decomposition at about 263–264° C., and analyzes for $C_{19}H_{10}O_6(OCC_6H_5)_2$ EXAMPLE 10.—*3,3'-methylenebis(4-hydroxycoumarin) di-trimethylacetate*

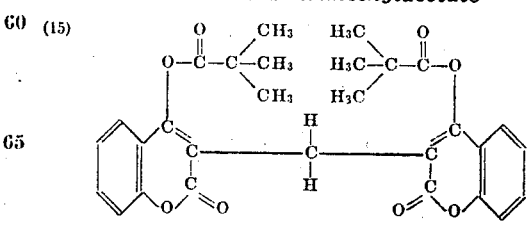

This di-trimethylacetate is prepared by either Method A or Method B, by the procedure given for the diacetate in Example 1; thus in Method A about 2.9 g. (0.024 mole) of trimethylacetyl chloride is used in place of the acetic anhydride. The di-trimethylacetate is separated and recrystallized in the same manner as the diacetate.

The yield is about 0.8 g., which is about 27%. 3,3'-methylenebis-(4-hydroxycoumarin) di-trimethylacetate melts at about 210–211° C., and analyzes for C₁₉H₁₀O₆(OCC(CH₃)₃)₂.

These di-esters of 3,3'-methylenebis(4-hydroxycoumarin) show in general anticoagulant properties similar to those of the parent 3,3'-methylenebis(4-hydroxycoumarin). They are most conveniently administered orally, but may be administered parenterally. When administered in either way, they act to lower the blood prothrombin level and to lengthen the clotting time of the blood, and thus act in vivo to prevent clotting. Their effect is ordinarily a day or two in developing, and lasts for rather a prolonged period of time.

It is believed that their anticoagulant action follows hydrolysis of the esters in vivo to 3,3'-methylenebis(4-hydroxycoumarin), although this is not established. That hypothesis seems probable because the esters which are the more difficult to hydrolyze in vitro show the less anticoagulant action in vivo, and the esters which are most difficult to hydrolyze, particularly the trimethylacetate, show only relatively little anticoagulant action. In general the higher aliphatic esters are more difficult to hydrolyze than are the lower ones, and show less anticoagulant action.

Thus by our esterification the anticoagulant action of a given amount of 3,3'-methylenebis(4-hydroxycoumarin) is reduced, and the action is prolonged over a greater period of time. Because of this, these esters are indicated where it is desirable to reduce the rate of action of this type of anti-coagulant, and to extend the period of the effect.

In consequence, by the use of these di-esters instead of the parent 3,3'-methylenebis(4-hydroxycoumarin) the likelihood of hemorrhage from the administration seems to be reduced; and it becomes possible to obtain anticoagulant effects with less danger of hemorrhage. Even so, however, excessive amounts of the esters may produce hemorrhage; and so their administration must be done carefully and under observation.

If overdoses are given, and a tendency to hemorrhage arises, that tendency can be combated and the prothrombin time and coagulation returned toward or to normal by transfusions of fresh normal blood.

These di-esters, by reason of their anticoagulant action, have many uses, both for prophylaxis and treatment, in blood-circulatory and vascular disturbances, including thrombosis, especially post-operative thrombosis, embolism, phlebitis, Buerger's disease, etc. The exploration of the extent of their uses is still far from complete; but in general they seem to be beneficial where heparin is beneficial, and to have the added advantages of oral administrability, prolonged action, and comparative cheapness.

We claim as our invention:

1. The new di-esters of 3,3'-methylenebis(4-hydroxycoumarin) which have the following general formula:

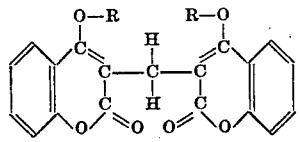

in which R represents an acyl group.

2. 3,3'-methylenebis(4-hydroxycoumarin) di-acetate, which has the following formula:

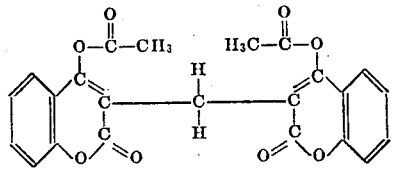

3. The method of preparing di-esters of 3,3'-methylenebis(4-hydroxycoumarin) which have the following general formula:

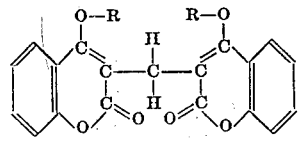

in which R represents an acyl group, which consists in reacting 3,3'-methylenebis(4-hydroxycoumarin) with a reagent of the class consisting of acyl halides and organic acid anhydrides.

4. The method of preparing di-esters of 3,3'-methylenebis(4-hydroxycoumarin) as set forth in claim 3, with the addition that the reagent is in marked excess.

5. The method of preparing di-esters of 3,3'-methylenebis(4-hydroxycoumarin) as set forth in claim 3, with the addition that the reaction is carried out in a basic organic solvent.

6. The method of preparing di-esters of 3,3'-methylenebis(4-hydroxycoumarin) as set forth in claim 3, with the addition that the reaction is carried out in pyridine as a solvent.

7. The method of preparing di-esters of 3,3'-methylenebis(4-hydroxycoumarin) which have the following general formula:

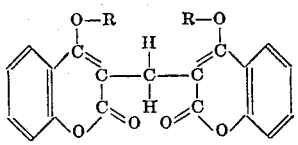

in which R represents an acyl group, which consists in treating 3,3'-methylenebis(4-hydroxycoumarin) with an organic acid anhydride.

8. The method of preparing di-esters of 3,3'-methylenebis(4-hydroxycoumarin) which have the following general formula:

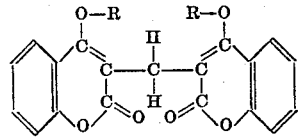

in which R represents an acyl group, which consists in heating 3,3'-methylenebis(4-hydroxycoumarin) with an organic acid anhydride.

9. The method of preparing di-esters of 3,3'-methylenebis(4-hydroxycoumarin) which have the following general formula:

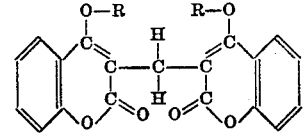

in which R represents an acyl group, which consists in heating 3,3'-methylenebis(4-hydroxycoumarin) with an organic acid anhydride under reflux conditions.

MARK A. STAHMANN.
KARL PAUL LINK.

Certificate of Correction

Patent No. 2,345,635.  April 4, 1944.

MARK A. STAHMANN ET AL.

It is hereby certified that errors appear in the printed specification of the above numbered patent requiring correction as follows: Page 1, second column, line 45, in the formula, for

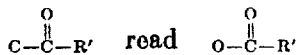

and same line, for

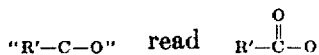

page 3, first column, line 68, for "di-iso-caproate" read *di-n-caproate*; and second column, line 30, for "3.3'" read *3,3'*; and that the said Letters Patent should be read with these corrections therein that the same may conform to the record of the case in the Patent Office.

Signed and sealed this 6th day of June, A. D. 1944.

[SEAL]

LESLIE FRAZER,
*Acting Commissioner of Patents.*